July 1, 1930.　　　H. R. PENCE　　　1,769,545
CULTIVATOR SHOVEL, WEEDER, AND MULCHER
Filed Jan. 10, 1929　　　2 Sheets-Sheet 1
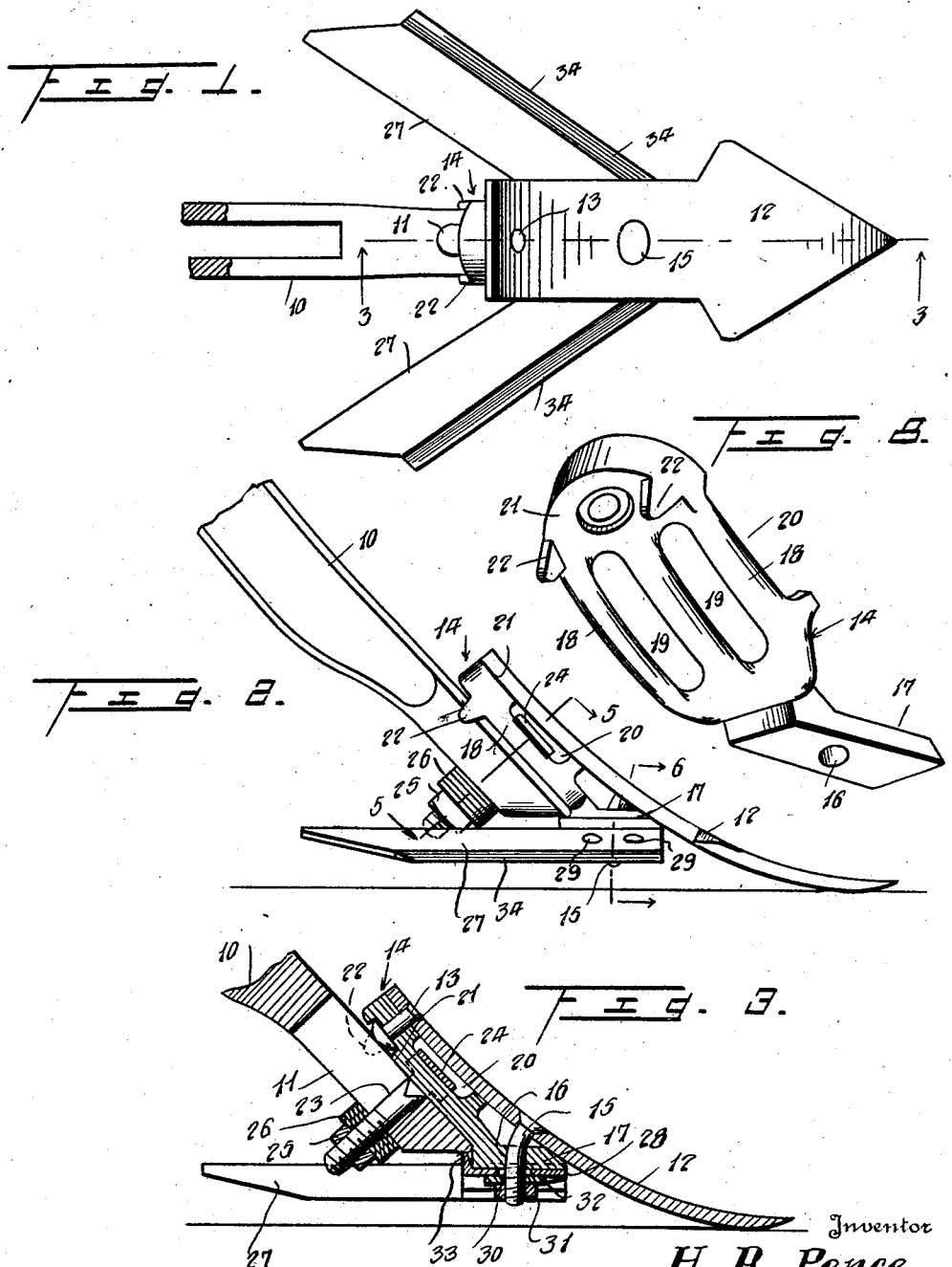
Inventor
H. R. Pence.
By
Attorney July 1, 1930.   H. R. PENCE   1,769,545
CULTIVATOR SHOVEL, WEEDER, AND MULCHER
Filed Jan. 10, 1929   2 Sheets-Sheet 2
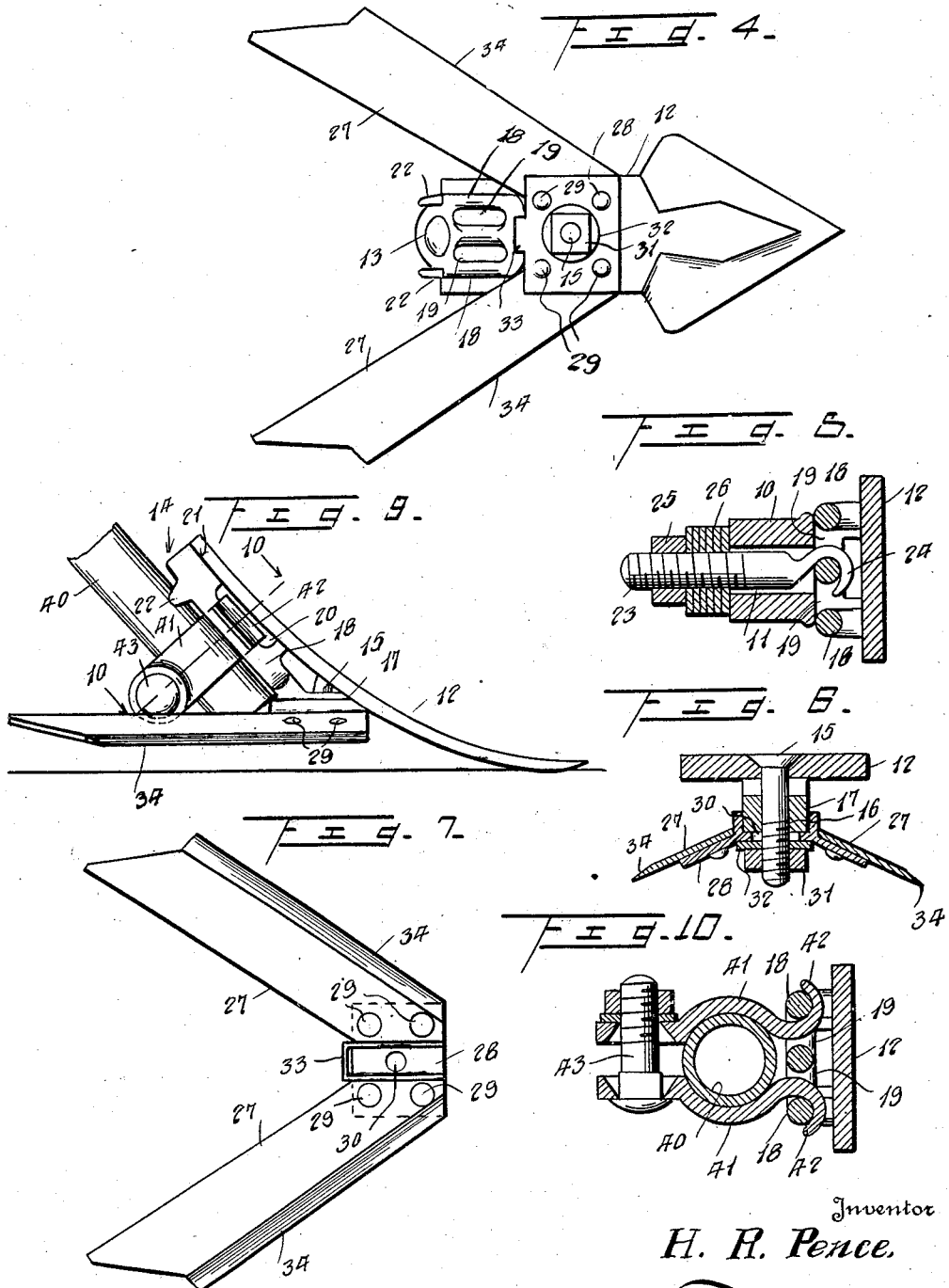
Inventor
H. R. Pence.
By 
Attorney Patented July 1, 1930

1,769,545

UNITED STATES PATENT OFFICE

HENRY R. PENCE, OF MARION, INDIANA

CULTIVATOR SHOVEL, WEEDER, AND MULCHER

Application filed January 10, 1929. Serial No. 331,522.

This invention relates to a novel cultivator shovel construction whereby the usual function of a shovel is performed and in addition weeds are cut, the ground is mulched and is left level.

An important object of the present invention is to provide a novel construction whereby hard ground may be penetrated and the shovel be of such form as to afford the proper suction to keep it in proper position, and to provide a shovel having blades which follow-under the surface of the soil so as to cut the weeds and work and mulch the ground and leave the latter level.

Another object is to provide a novel construction wherein the plows are easier to guide and the shovel is capable of universal use in existing structures of cultivators inasmuch as it may be attached to round or square cultivator shanks.

Various additional objects and advantages will be pointed out or become apparent from a consideration of the description following taken in connection with accompanying drawings illustrating an operative embodiment.

In said drawings:—

Figure 1 is a view of the improved cultivator shovel in plan and in connection with the cultivator shank to carry the same, Figure 2 is a side elevation of the parts of Figure 1, Figure 3 is a sectional view taken on the line 3—3 of Figure 1, Figure 4 is an inverted plan view of the parts of Figure 1, Figure 5 is a sectional view taken on the line 5—5 of Figure 2, Figure 6 is a sectional view taken on the line 6—6 of Figure 2, Figure 7 is a plan view of the weeder and mulcher blade construction, Figure 8 is a perspective view of the attaching plate, Figure 9 is a side elevation illustrating the use of the shovel in connection with a different form of shank from that shown in the previous views, and Figure 10 is a cross sectional view taken on the line 10—10 of Figure 9.

In Figures 1 to 5, a conventional shank of a cultivating machine is shown at 10, which is adapted to carry a cultivator shovel. The shank shown is square in cross section and is provided with a slot 11 through the same adjacent the lower end.

The cultivator shovel is shown at 12 being preferably curved as shown but generally of conventional form. Such shovel 12 by means of a rivet 13 or the like, is rigidly secured to an attaching plate 14 of the form best illustrated in Figure 8. A bolt 15 also extends through the shovel 12, being rigid therewith and secured thereto or loose, as preferred, and such bolt passes through an opening 16 of an end lug 17 integral with the plate 14. Plate 14 preferably is in one piece and has three strips 18 spaced from each other by slots 19 and also spaced as shown at 20 from the surface 21 thereof against which the shovel 12 fits.

Also the attaching plate 14 has integral ears 22 thereon adapted to overlap opposite sides of the shank 10 to aid in rigidly securing the shovel to the shank and particularly against pivotal movement relatively thereto from a single bolt which is employed as at 23. Such bolt 23 passes through the slot 11 and as best shown in Figure 5 has a hook 24 which engages the central strip 18 and which is drawn tightly in place by a nut 25 on the bolt 23, washers 26 being interposed between the nut 25 and shank 10 if desired.

The shovel has coacting therewith, a pair of knives or blades 27 which are similar in form in diverging relation by means of a plate as as 28 and rivets 29. Said plate 28 has a bolt hole 30 therethrough, which is preferably round as shown, through which bolt 15 extends and beneath which a nut 31 and washer 32 may be applied to the bolt. The plate 28 has a V-shaped flange 33 to surround the rear of the lug 17 to overcome the tendency of blades 27 to turn on bolt 15 as a fulcrum. It will be noted that the blades 27 are substantially horizontal or in parallelism to the ground and work below the surface of the ground above the point of shovel 12. Such blades have their outer side edges sharpened as at 34. In lieu of two blades 27, a single blade may be provided for either right or left hand use, as in cultivating corn or the like.

With the invention in operation, since the knives or cutters 27 are fastened above the point of the shovel, the latter can penetrate hard ground so as to have the proper suction to keep it working. The shovel plows the ground ahead and the blades 27 follow under the plowed surface so as to cut weeds and work and mulch all of the ground and leave the latter level. The angular position of the blades is important as it enables them to work more efficiently and to scour and have the proper suction to plow in hard ground. Since the blades or cutters 27 work just under the surface of the soil, they will wear much longer, pull easier and make the plows easier to guide.

The invention is not only capable of attachment to the particular shank illustrated at 10 but is capable of attachment practically universal to all shanks. For instance a round or tubular shank is shown in Figures 9 and 10 and the invention is connected thereto. Such shank is designated 40 and is surrounded by clamp elements 41 having hooks 42 which are passed through the openings 19 and engage the outer strip 18. Such clamp jaws 41 are secured rigidly in place to the shank 40 by means of a bolt as at 43.

Various changes may be resorted to provided they fall within the spirit and scope of the invention.

I claim as my invention:—

A device of the class described comprising a shovel, an attaching plate carried thereby having portions spaced apart to provide slots to accommodate fastening elements, a lug on said plate engaging said shovel, ears on said plate to engage a shank, soil treating blades in the rear of the shovel engaged by said lug, and a bolt passing from the shovel through said lug and through said blades.

In testimony whereof I affix my signature.

HENRY R. PENCE.